(12) United States Patent
Coleman et al.

(10) Patent No.: US 8,526,106 B2
(45) Date of Patent: Sep. 3, 2013

(54) METHOD AND APPARATUS FOR MANAGING OPTICAL NON-UNIFORMITIES IN SEAMING PROCESSES

(75) Inventors: David A. Coleman, Louisville, CO (US); Gary D. Sharp, Boulder, CO (US)

(73) Assignee: RealD Inc., Beverly Hills, CA (US)

( * ) Notice: Subject to any disclaimer, the term of this patent is extended or adjusted under 35 U.S.C. 154(b) by 0 days.

(21) Appl. No.: 13/416,693

(22) Filed: Mar. 9, 2012

(65) Prior Publication Data

US 2012/0229894 A1 Sep. 13, 2012

Related U.S. Application Data

(60) Provisional application No. 61/450,637, filed on Mar. 9, 2011.

(51) Int. Cl.
*G03B 21/56* (2006.01)
*G03B 21/60* (2006.01)

(52) U.S. Cl.
USPC ............. 359/443; 359/449; 359/451; 428/57; 428/58; 428/61; 428/212

(58) Field of Classification Search
CPC ......... G03B 21/56; G03B 21/60; E04F 13/00; B41L 13/00
USPC ........ 348/840; 359/443, 445, 449, 450–451; 359/461; 428/57–58, 212
See application file for complete search history.

(56) References Cited

U.S. PATENT DOCUMENTS

| | | | | |
|---|---|---|---|---|
| 1,856,739 A * | 5/1932 | Alt et al. | | 428/61 |
| 2,151,236 A * | 3/1939 | Schwartz et al. | | 359/453 |
| 2,216,901 A * | 10/1940 | Bodde | | 359/445 |
| 2,245,896 A * | 6/1941 | Bodde | | 359/445 |
| 2,278,073 A * | 3/1942 | Harkness | | 427/163.3 |
| 2,448,560 A * | 9/1948 | Walker | | 427/163.3 |
| 2,683,679 A * | 7/1954 | Hurd et al. | | 428/57 |
| 2,813,054 A * | 11/1957 | Nicholas | | 156/93 |
| 2,974,566 A * | 3/1961 | Hurley | | 359/445 |
| 3,016,794 A * | 1/1962 | Crandon | | 359/445 |
| 3,237,517 A * | 3/1966 | Komitor | | 359/451 |
| 3,712,846 A * | 1/1973 | Daniels et al. | | 428/141 |
| 4,146,661 A * | 3/1979 | Grandel et al. | | 428/42.3 |
| 4,840,829 A * | 6/1989 | Suzuki et al. | | 428/131 |
| 5,011,263 A * | 4/1991 | Hopper | | 359/451 |
| 5,473,454 A * | 12/1995 | Blanchard | | 349/112 |
| 6,128,130 A * | 10/2000 | Zobel et al. | | 359/443 |
| 6,322,657 B1 * | 11/2001 | Pontuti et al. | | 156/304.3 |
| 6,522,472 B1 * | 2/2003 | Green | | 359/630 |
| 6,822,389 B2 * | 11/2004 | Kwasnick et al. | | 313/500 |

(Continued)

*Primary Examiner* — Clayton E Laballe
*Assistant Examiner* — Kevin Butler
(74) *Attorney, Agent, or Firm* — Baker & McKenzie LLP

(57) ABSTRACT

Methods to substantially reduce or eliminate optical non-uniformity across an interface may also substantially improve the strength and ease of seam manufacturing, including joining substrates. The methods may include managing optical non-uniformities at least by broadening a region over which a change in optical loss may occur and/or by maintaining a substantially constant average optical loss across an interface. The methods may also include forming a seam that substantially reduces the appearance of optical non-uniformities at the seam, which may include maintaining approximately constant average loss in the vicinity of the seam by substantially controlling reflectivity in the vicinity of the seam, in which substantially controlling reflectivity in the vicinity of the seam may include employing a backer treated to minimize optical reflectivity over a range of angles.

25 Claims, 5 Drawing Sheets

(56) References Cited

U.S. PATENT DOCUMENTS

| | | | |
|---|---|---|---|
| 7,068,427 B2* | 6/2006 | Hopkins et al. | 359/443 |
| 7,453,633 B2* | 11/2008 | Hopper et al. | 359/451 |
| 7,777,947 B2* | 8/2010 | Congard et al. | 359/445 |
| 8,004,758 B2* | 8/2011 | Coleman et al. | 359/459 |
| 8,194,315 B2* | 6/2012 | Sharp et al. | 359/452 |
| 2002/0131018 A1* | 9/2002 | Lucas | 352/85 |
| 2005/0034614 A1* | 2/2005 | Kasuya | 101/127.1 |
| 2006/0274413 A1* | 12/2006 | Hopper et al. | 359/451 |
| 2009/0190210 A1 | 7/2009 | Coleman | |
| 2009/0297797 A1* | 12/2009 | Coleman et al. | 428/195.1 |
| 2011/0149389 A1* | 6/2011 | Sharp et al. | 359/452 |
| 2012/0237675 A1* | 9/2012 | Sharp et al. | 427/163.3 |
| 2012/0262784 A1* | 10/2012 | Saito et al. | 359/443 |
| 2013/0017371 A1* | 1/2013 | Kondo | 428/189 |

* cited by examiner

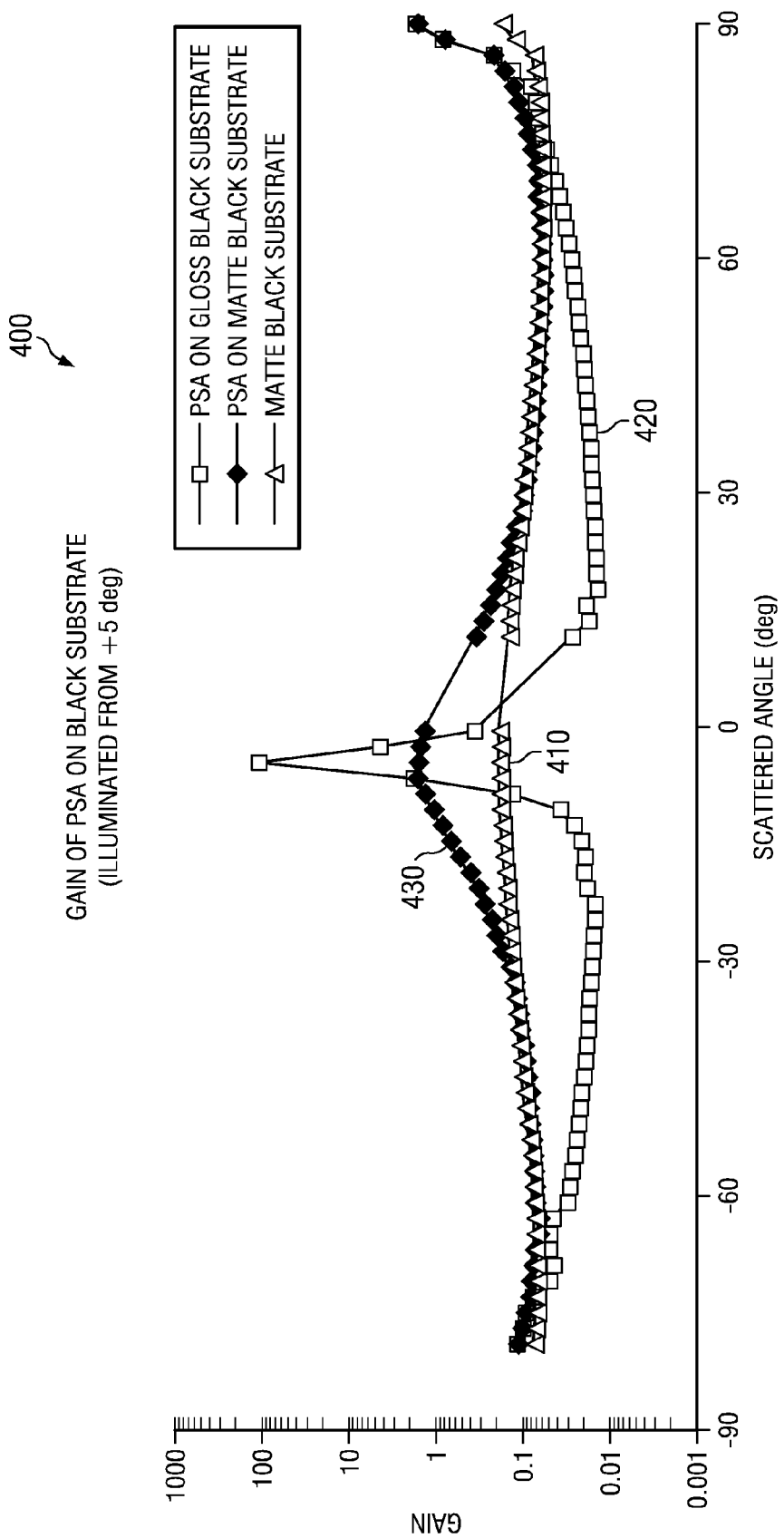

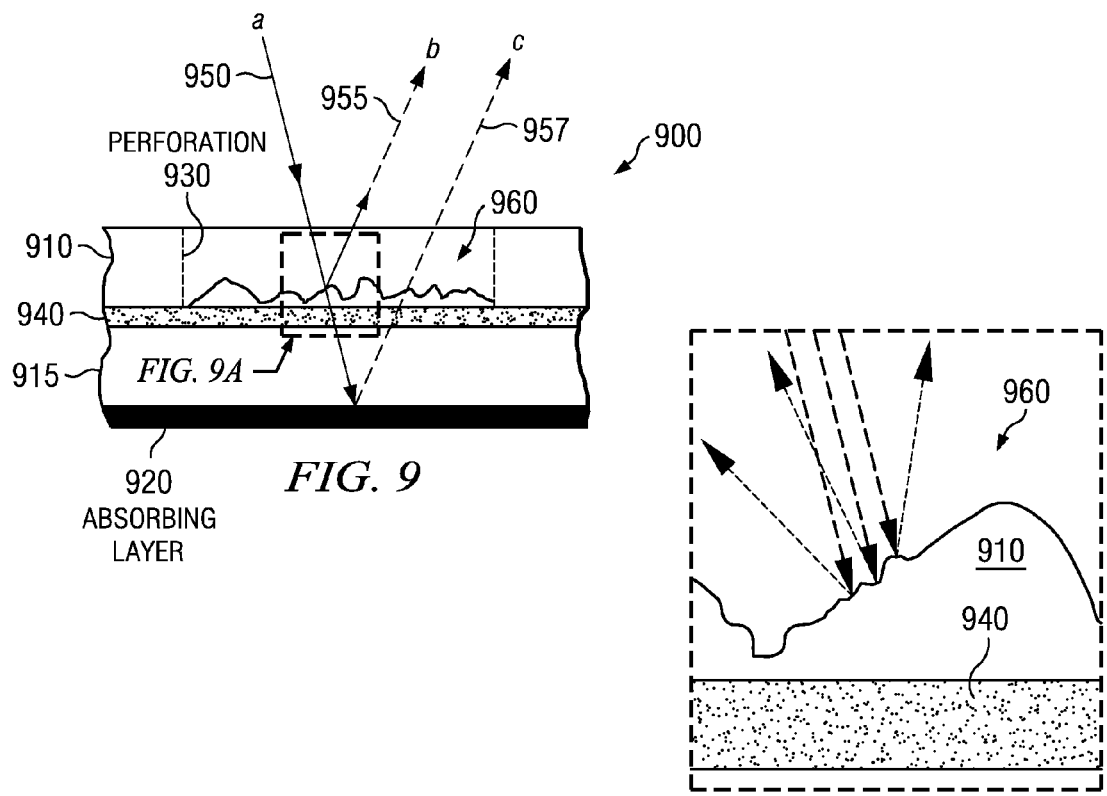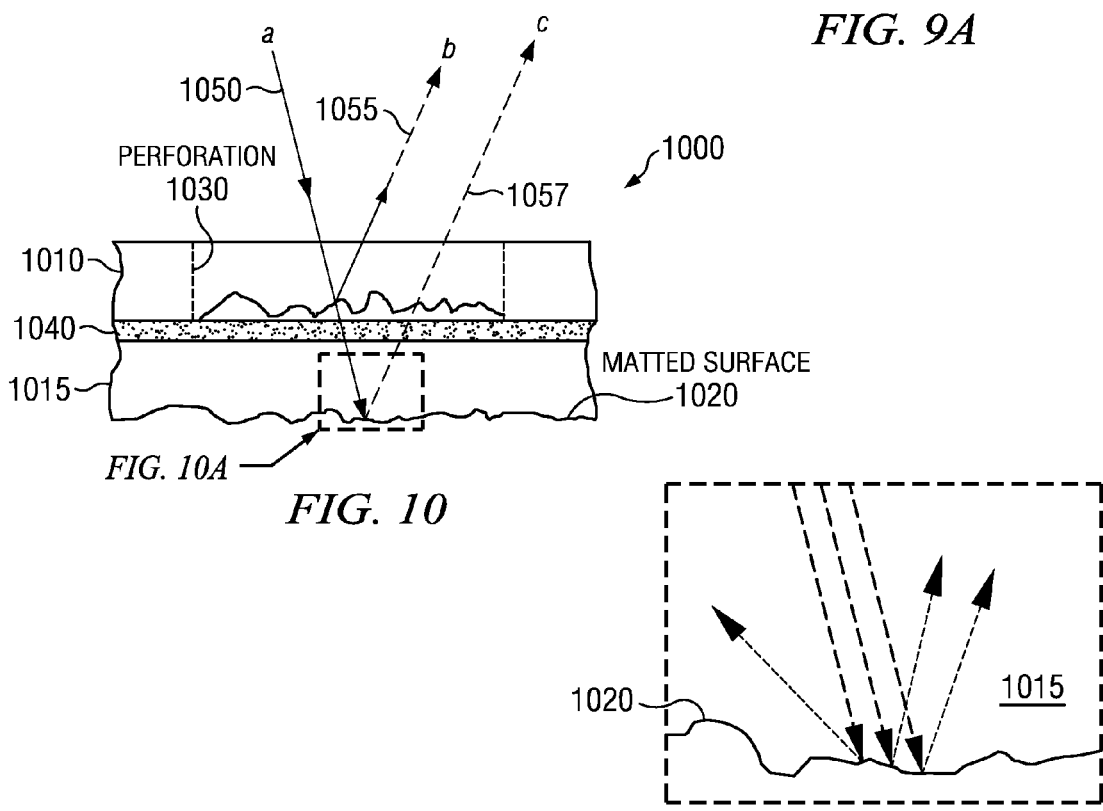

METHOD AND APPARATUS FOR MANAGING OPTICAL NON-UNIFORMITIES IN SEAMING PROCESSES

CROSS-REFERENCE TO RELATED APPLICATIONS

This application claims priority to U.S. Provisional Patent Application Ser. No. 61/450,637, filed Mar. 9, 2011, entitled "Method and apparatus for managing optical non-uniformities in screen seaming processes," the entirety of which is herein incorporated by reference.

TECHNICAL FIELD

The present disclosure generally relates to front projection screens, and more specifically, to polarization preserving front projection screens.

BACKGROUND

An ideal front projection screen uniformly reflects light from one or more projectors to a distribution of viewers. The projection surface should be free from any spatially resolvable non-uniformities or defects that may be perceptible to the viewers. Any such features may overlay the intended content and detract from the viewing experience. Unfortunately, due to methods of construction and due to audio requirements, a typical cinema screen may typically incorporate at least two such sources of defects. Because of the difficulty of manufacturing a single unbroken expanse of substrate large enough to comprise a screen, most screens are manufactured by seaming together roll stock. The change in surface reflectivity across the seam and the gap between adjacent sheets should be sufficiently small that it is substantially imperceptible to the audience.

Additionally, in many cinemas, speakers are typically located behind the screen for front-channel audio. In order to achieve acoustic transmission through the screen, the screen is typically perforated with an array of holes. Again, the array of holes should be small enough that it is not visible to the audience. The seams and perforations individually present a challenge to the maintenance of an optically uniform surface, however the combination of these two effects provide an even more difficult challenge; the interruption of the perforation pattern by the seam can render an otherwise unobjectionable perforation pattern highly visible. Furthermore, the presence of the perforations may limit the techniques in which the screen may be seamed together.

BRIEF SUMMARY

According to the present disclosure, a method for managing optical non-uniformities may include substantially masking a change in optical loss at a seam by broadening a region over which the change in optical loss occurs and gradually varying the perforation pattern by the seam. The perforation pattern may be gradually varied by increasing the cross-web spacing of the perforation pattern by the seam and the space between the perforations may be tapered over a distance such that the change in optical intensity reflected from the material forming the seam may be below a just noticeable difference. The perforation pattern may also be gradually varied by increasing the distance from the edge of the film to the last perforation relative to the seam. Furthermore, the distance between the perforations may be gradually decreased as a function of the distance from the edge of the seam.

According to another embodiment of the present disclosure, a method for managing optical non-uniformities may include maintaining a substantially constant average optical loss across an interface by printing patterns over a region in which the optical loss may occur, and in which the patterns optically absorb at least some light. The method may also include maintaining a substantially spatially uniform perforation pattern across a web material, in which the perforation pattern may stop short of the edge of the web material, and thus may create a non-perforated region in the vicinity of the edge of the web material. An array of black dots may be printed on the non-perforated region in the vicinity of the edge of the web material. The black of the array or black dots may be matte black dots and may be substantially optically absorbing.

Continuing the discussion of this embodiment, the diameter of the black dots closest to the seam may be decreased or the black dots may be printed with approximately the same diameter and spacing as the perforations. Alternatively, the black dots may be printed with a smaller diameter and a smaller lattice spacing than the perforation pattern. The array of black dots may be approximately registered with the perforation pattern. Moreover, the printed pattern may include printing ink dots in which the attenuation of the ink may not be substantially dependent on the angle of incidence of illuminating light or scattered light.

In yet another embodiment of the present disclosure, a method for forming a seam that substantially reduces the appearance of optical non-uniformities at the seam may include maintaining approximately constant average loss in the vicinity of the seam by substantially controlling reflectivity in the vicinity of the seam, and in which substantially controlling reflectivity in the vicinity of the seam may include employing a backer treated to minimize optical reflectivity over a range of angles. The backer may include an adhesive with an embossed texture that may serve to substantially diffuse specular reflection and the backer may be coated with a diffuse black material. The diffuse black material may be patterned in a dot pattern on the backer and may be patterned in at least a row. The black dots on the backer may be approximately registered with the perforation pattern.

In yet another embodiment of the present disclosure, a front projection screen with a projection surface may include a first portion of a first substrate and a first portion of a second substrate, wherein the first portion of the first substrate and the first portion of the second substrate are perforated with holes and a backer operable to join the first portion of the first substrate and the first portion of the second substrate, wherein the first portion of the first substrate may form a seam with the first portion of the second substrate, and in which the backer is textured such that the surface of the first side of the backer may perform substantially similar as a diffuser. The first and second substrate may be the same material. Additionally, the first side of the backer further may be a textured surface and the textured surface may be proximate to an adhesive. The second side of the backer may include an absorbing layer and/or may be a textured surface.

These and other advantages and features of the present disclosure will become apparent to those of ordinary skill in the art upon reading this disclosure in its entirety.

BRIEF DESCRIPTION OF THE DRAWINGS

Embodiments are illustrated by way of example in the accompanying figures, in which like reference numbers indicate similar parts, and in which:

FIG. 4 is a graph illustrating the gain from a pressure sensitive adhesive on multiple substrates, in accordance with the present disclosure;

FIG. 9 is a schematic diagram illustrating another embodiment of a cross section of a screen, in accordance with the present disclosure;

FIG. 9A is a schematic diagram illustrating yet another embodiment of a cross section of a screen, in accordance with the present disclosure;

FIG. 10 is a schematic diagram illustrating another embodiment of a cross section of a screen, in accordance with the present disclosure; and FIG. 10A is a schematic diagram illustrating yet another embodiment of a cross section of a screen, in accordance with the present disclosure.

DETAILED DESCRIPTION

Figure 1:
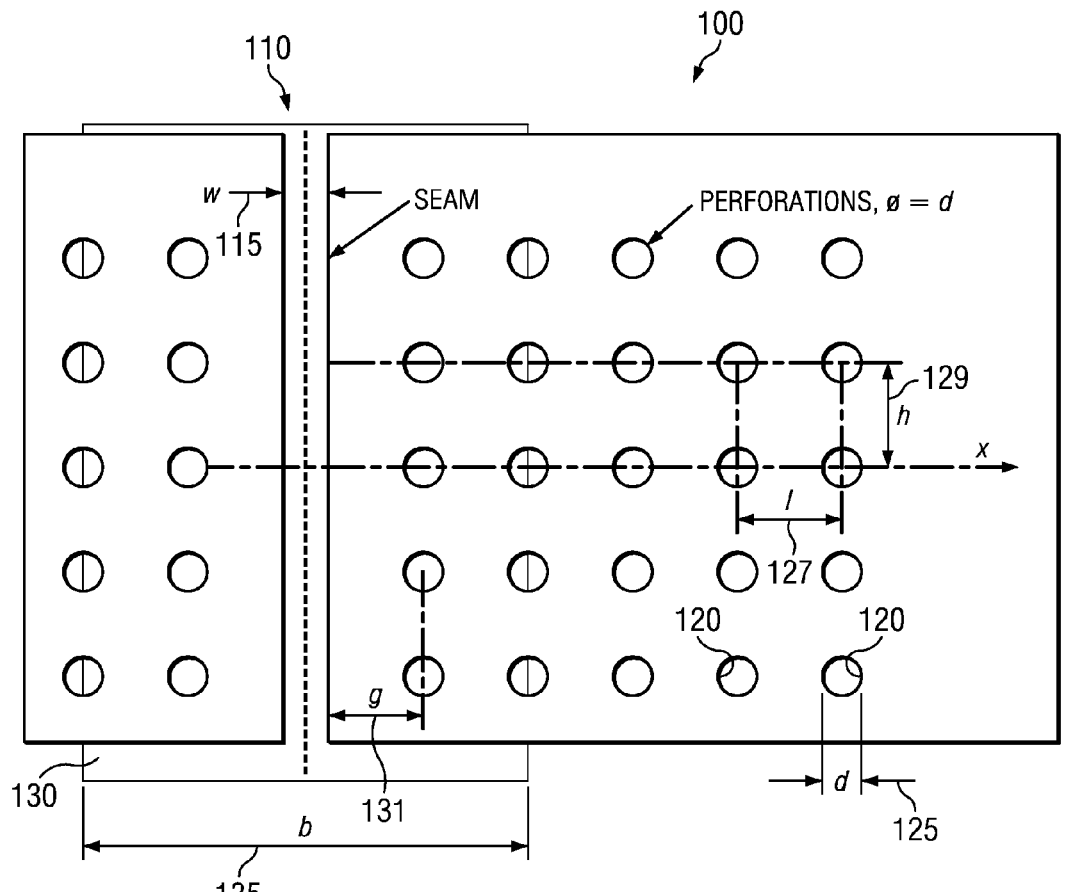
FIG. 1 is a schematic diagram illustrating one embodiment of a screen surface in the vicinity of a seam.

According to the present disclosure, a method for managing optical non-uniformities may include substantially masking a change in optical loss at a seam by broadening a region over which the change in optical loss occurs and gradually varying the perforation pattern by the seam. The perforation pattern may be gradually varied by increasing the cross-web spacing of the perforation pattern by the seam and the space between the perforations may be tapered over a distance such that the change in optical intensity reflected from the material forming the seam may be below a just noticeable difference. The perforation pattern may also be gradually varied by increasing the distance from the edge of the film to the last perforation relative to the seam. Furthermore, the distance between the perforations may be gradually decreased as a function of the distance from the edge of the seam.

According to another embodiment of the present disclosure, a method for managing optical non-uniformities may include maintaining a substantially constant average optical loss across an interface by printing patterns over a region in which the optical loss may occur, and in which the patterns optically absorb at least some light. The method may also include maintaining a substantially spatially uniform perforation pattern across a web material, in which the perforation pattern may stop short of the edge of the web material, and thus may create a non-perforated region in the vicinity of the edge of the web material. An array of black dots may be printed on the non-perforated region in the vicinity of the edge of the web material. The black of the array or black dots may be matte black dots and may be substantially optically absorbing.

Continuing the discussion of this embodiment, the diameter of the black dots closest to the seam may be decreased or the black dots may be printed with approximately the same diameter and spacing as the perforations. Alternatively, the black dots may be printed with a smaller diameter and a smaller lattice spacing than the perforation pattern. The array of black dots may be approximately registered with the perforation pattern. Moreover, the printed pattern may include printing ink dots in which the attenuation of the ink may not be substantially dependent on the angle of incidence of illuminating light or scattered light.

In yet another embodiment of the present disclosure, a method for forming a seam that substantially reduces the appearance of optical non-uniformities at the seam may include maintaining approximately constant average loss in the vicinity of the seam by substantially controlling reflectivity in the vicinity of the seam, and in which substantially controlling reflectivity in the vicinity of the seam may include employing a backer treated to minimize optical reflectivity over a range of angles. The backer may include an adhesive with an embossed texture that may serve to substantially diffuse specular reflection and the backer may be coated with a diffuse black material. The diffuse black material may be patterned in a dot pattern on the backer and may be patterned in at least a row. The black dots on the backer may be approximately registered with the perforation pattern.

In yet another embodiment of the present disclosure, a front projection screen with a projection surface may include a first portion of a first substrate and a first portion of a second substrate, wherein the first portion of the first substrate and the first portion of the second substrate are perforated with holes and a backer operable to join the first portion of the first substrate and the first portion of the second substrate, wherein the first portion of the first substrate may form a seam with the first portion of the second substrate, and in which the backer is textured such that the surface of the first side of the backer may perform substantially similar as a diffuser. The first and second substrate may be the same material. Additionally, the first side of the backer further may be a textured surface and the textured surface may be proximate to an adhesive. The second side of the backer may include an absorbing layer and/or may be a textured surface.

Due to the finite resolving power of the human eye, there may be three qualitatively different viewing regimes with respect to the perforations. In a first example, a viewer may be relatively close to a screen and the angular distance subtended by a perforation on the screen may be large compared to the angular resolving power of the eye. In this first example, distances may be less than approximately five meters and include approximately 1.2 mm perforations and the shapes of the individual holes may be visible. In a second example or the middle region where the distance between perforations subtends an angular distance less than or equal to the angular resolving power of the eye, even if the shape of individual perforations cannot be resolved, the presence of the perforations may be visible as a discernible variation in intensity. A third example, in which the bulk of a cinema auditorium should be comprised, may include a viewing region in which the eye cannot resolve the angular separation between perforations. For these distant viewers in the third example, the screen surface may appear uniform and unmarred by perforations or holes. The terms "perforations" and "holes" may be used interchangeably herein for discussion purposes only and not of limitation. It is beneficial to choose a hole size and spacing that are as small as possible, such that the majority of the auditorium may experience a viewing condition similar to the third example. An additional consideration may be to maintain the uniformity of the screen surface within the second region. For example, a uniform array of small features may be less noticeable than an array with either randomly or uniformly located discontinuities in the pattern. Further, in maintaining the uniformity of the screen surface, the collective effect of a large number of individually indistinguishable features may be considered. In another example, the intersection of the seam with the perforation pattern may produce a change that may be imperceptible on the scale of a single perforation but which collectively may be visible as a line.

In conventional cinema screen construction, roll stock of plastic sheet, which may typically include polyvinyl chloride (PVC) is prepared and then seamed together to form the full screen. Although the seam may be formed by a wide variety of techniques, the most common may be some form of lap or butt joint. In the case of lap joints a technique may be employed to planarize the seam after the lap joint is formed. For butt joints, in order to obtain sufficient strength, a backer may be applied to the back surface of the screen to reinforce the joint. Additionally, any planarization step, for example re-melting the surface of a lap joint, may only distort the shape of the perforation to the extent that the total area remains approximately constant.

Because perforation equipment may not readily be available in cinema-screen widths, the perforation process may be performed on the roll stock prior to seaming. This may introduce two difficulties into the seaming step: 1) the perforations should be approximately aligned and approximately registered in adjacent sheets; and 2) the seaming process should not substantially damage the perforations. In practice this may introduce a limitation on the width of the backer or lap that can be used in the joints. In one embodiment, the backer/lap may be narrow enough to fit between the perforations. If the backer does not fit between perforations, then it may cover some of the perforations. The loss in acoustic transmission is inconsequential but more problematic may be that the backer is visible through the perforations. For typical adhesives, a black material may be used; however, there may be a relatively large reflection in the specular direction that may be visible as a "hotspot" in the vicinity of the perforations.

The present disclosure presents several techniques to substantially eliminate optical non-uniformity that may be in part, induced by the seaming process while simultaneously improving the strength and ease of seam manufacturing. These techniques may be categorized into three general types: 1) substantially masking a change in optical loss at the seam by broadening the region over which such a change in loss occurs, 2) substantially maintaining constant average loss across the seam by replacing perforations with highly absorbing printed regions, 3) substantially maintaining constant average loss in the vicinity of the seam by appropriately texturing and coloring the backer to minimize reflectivity. The first two types may include a perforation or gap in the seam in the screen which may be a source of optical loss. For the vast majority of the audience the physical structure that causes the loss is not visibly resolvable and so additional sources of loss may be introduced in order to substantially maintain a uniform average loss. In the third type, a foreign material (backer/adhesive) may be visible within the holes and so the reflection from this material may be controlled such that it is insignificant when compared to the bulk of the screen surface.

According to one embodiment, the cross-web spacing of the perforation pattern may be gradually increased in the vicinity of the seam. The distance from the edge of the film to the last perforation may be increased to allow sufficient non-perforated substrate for the seaming process. The optical impact of this increased area of non-perforated screen may be that the region near the seam appears effectively brighter than the surrounding area. This optical effect may be mitigated by gradually decreasing the distance between perforations as a function of distance from the edge. The distance over which the taper occurs may be set so that the change in intensity reflected from the screen may be below a just noticeable difference (JND).

According to another embodiment, the perforation pattern may be spatially uniform across the web of roll stock and may stop short of the edge of the material. In maintaining a substantially uniform intensity across the seam, the surface in the non-perforated region may be printed with an array of matte black dots. In order to substantially compensate optical loss in the seam gap, the diameter of the dots closest to the seam can be decreased. In one embodiment the dots may have the approximately the same diameter and spacing as the perforations and may be approximately registered with the perforation pattern. This may yield the highest visual uniformity across the largest region of the theater. In an alternative embodiment the dots may be printed with smaller diameter and on a smaller lattice thus relaxing the requirement on registration with the perforations and across the seam.

According to another embodiment, the perforation pattern may be uniform across the surface of the film but the adhesive surface of the backer may be treated to minimize its optical reflectivity over a range of angles. In one embodiment this treatment can take the form of an embossed texture of the adhesive that may serve to diffuse the specular reflection from the exposed adhesive at the perforations. An alternative embodiment may be to coat the backer with diffuse black ink in either a dot pattern and/or rows that may then be approximately registered with the perforations. In both cases the contribution of the backer to the total reflected intensity of the screen may be reduced below a JND for many to all viewing positions within the theater.

In many embodiments, the flatness of the seams made in rigid materials such as PET or PC can be enhanced by rotating the seam away from vertical. In one example, the seams may be oriented horizontally in which case the curvature of the screen on the mount may substantially suppress undulation in the material transverse to the seam. Incremental benefit can be obtained by tilting the seam by as little as approximately 10-15 degrees from the vertical direction.

Description of the Model

FIG. 1 is a schematic diagram illustrating one embodiment of a screen surface in the vicinity of a seam. Further, FIG. 1 shows a typical screen surface 100 in the vicinity of a seam 110 in which the seam 110 incorporates a gap of width w 115. Without loss of generality, we assume a square lattice of perforations, in which the perforations 120 may have a diameter d 125 with horizontal lattice spacing/127 and vertical lattice spacing h 129, and in which vertical lattice spacing 129 may be oriented substantially parallel to the seam 110. The center of the perforation 120 which is closest to the seam 110 may be located a distance g 131 from the start of the seam gap. The seam 110 may be held together by a backer 130 with width b 135. In FIG. 1, the backer 130 may substantially or completely cover one full column of perforations 120 and approximately half of the next column on each side of the seam 110. To the extent the backer 130 may not be substantially absorbing, the backer 130 may be visible within all of these perforations 120.

For improved optical performance, the gap may be minimized, w→0 and the perforation pattern may be continuous across the seam, g=1, and the backer 130 may be narrow enough that it does not substantially overlap with any perforations, b<1−d. In many practical situations it may be difficult to achieve a seam gap less than approximately 50 microns and for typical approximately 1.2 mm perforations on an approximately 4.5 mm lattice, a backer with an approximate width of 3.3 mm may have insufficient width to provide a durable seam. Furthermore, this 3.3 mm backer may use small tolerances in the locations of the perforation holes, slitting of the backer, and placing of the backer.

To model the optical effect of the seam, the intensity of the light reflected from the screen in the vicinity of the seam can be approximated by a one dimensional function of x, the perpendicular distance from the seam, $$I(x) = \int_{y_{char}} I(x, y) dy$$

in which $y_{char}$ may be sufficiently large to capture most and/or all structure in the direction substantially parallel to the seam, for example, $y_{char}$=h, the spacing between perforations.

Figure 2:
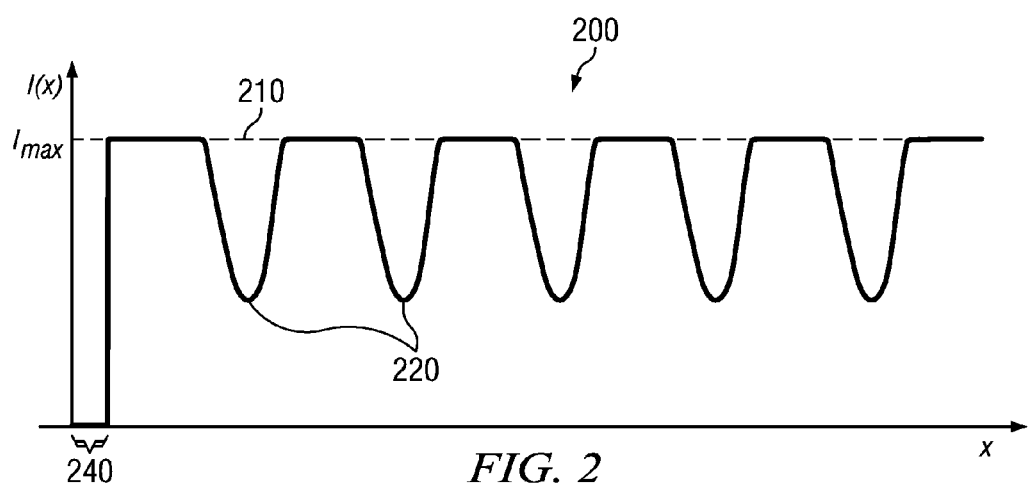
FIG. 2 is a graph illustrating the intensity of light reflected from the screen illustrated in FIG. 1 and neglecting any contribution from the backer, in accordance with the present disclosure.

FIG. 2 is a graph illustrating the intensity of light reflected from the screen illustrated in FIG. 1, and neglecting any contribution from the backer. Further, FIG. 2 illustrates a plot of I(x) 200 for the screen shown in FIG. 1 neglecting any contribution from the backer. As shown in FIG. 2, the intensity of light may have an approximately maximum value, Imax 210. Additionally in FIG. 2, the intensity of light reflected from the screen may periodically decrease, illustrated on the plot of I(x) 200 as troughs 220, due to the light encountering the perforations 120 in the screen 100 of FIG. 1. In the interval 240 of the example illustrated in FIG. 2, the intensity of light reflected from the screen may be low or substantially zero as the contribution from the backer has been neglected, thus the light may encounter the seam gap in the interval 240.

Figure 3:
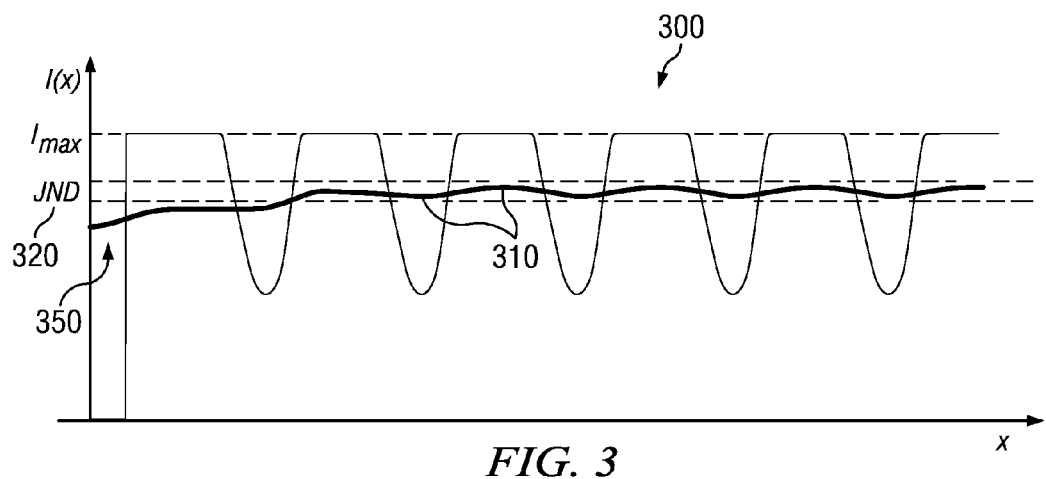
FIG. 3 is a graph illustrating the intensity of light reflected from the screen illustrated in FIG. 1 and neglecting any contribution from the backer, in accordance with the present disclosure.

In approximately calculating what an observer sees, the intensity function of FIG. 2 may be convolved with the point spread function (PSF) of the human eye which may depend on the distance from the observer to the screen. FIG. 3 is a graph illustrating the intensity of light reflected from the screen illustrated in FIG. 1 and neglecting any contribution from the backer illustrated as the grey curve. The dark curve of FIG. 3 illustrates the same curve convolved with the point spread function (PSF) of the human eye. Further, FIG. 3 is a graph illustrating the intensity of reflected light (grey curve) as well as the same curve convolved with the point spread function (PSF) of the human eye (black curve). FIG. 3 illustrates a graph 300 at an approximate distance at which the modulation from the perforations 310 may be smaller than a JND 320, but at which the intensity loss 300 due to the seam gap may be larger than a JND. In this case, the net result may be that a dark band corresponding to the seam may be visible in a substantial part of the theater.

Including the optical contribution of the backer, the viewing angle dependence of the scattering from the backer may be unlikely to match the angle dependence of the screen surface. FIG. 4 is a graph illustrating the gain from a pressure sensitive adhesive (PSA) on multiple substrates. The PSA used was transferred to each substrate from a temporary release liner. Further, FIG. 4 illustrates a graph 400 of a gain measurement from a matte black substrate 410, a gain measurement from a pressure sensitive adhesive on a gloss substrate 420, and a gain measurement from a pressure sensitive adhesive on a matte black substrate 430. The samples were illuminated from approximately +5 degrees so that the specular reflection at approximately −5 degrees would be detectable. The scattered intensity may be composed of approximately 4% reflection from the first surface of the adhesive combined with the reflection off of the adhesive-substrate interface.

Continuing the discussion of FIG. 4, the PSA layer may conform to the surface of the substrate and may be limited by the thickness of the PSA relative to the roughness of the substrate, thus the topography of the substrate may partially determine the topography of the PSA layer and the scatter profile. As illustrated by the gain measurement from the pressure sensitive adhesive on the gloss substrate 420, the PSA remains substantially planar on the gloss substrate and so the gain profile may be composed primarily of a spike caused at least in part, by the specular reflection. This spike in intensity may be visible from an isolated viewing direction as bright points or "sparkles" emanating from the perforations. In most or all other viewing directions there may be no substantially perceptible light emanating from the perforations. As shown by the gain measurement from the pressure sensitive adhesive on the matte black substrate 430, the matte black substrate may impart some roughness to the PSA layer and so there may be a much broader distribution of scattered light. A matte substrate may be able to eliminate the "sparkle" but may still reflect a significant amount of light. The transfer PSA film used in this experiment represents the high-end range of conformity. A film cast from the fluid state directly onto a substrate is likely to effectively planarize the substrate resulting in a substantially planar, glossy top PSA surface.

Figure 5:
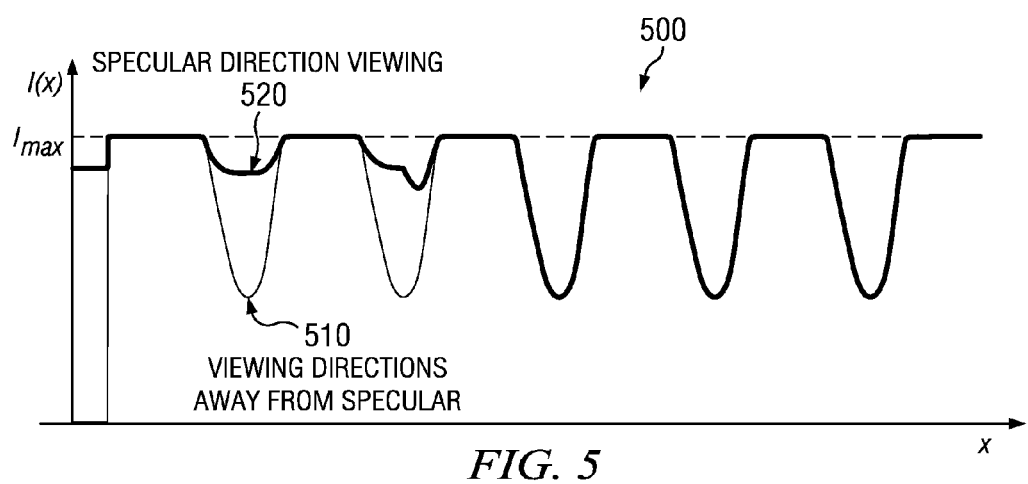
FIG. 5 is a graph illustrating the intensity of light reflected from the screen illustrated in FIG. 1 with a matte backer applied across the back surface of the screen, in accordance with the present disclosure.

FIG. 5 is a graph illustrating the intensity of light reflected from the screen illustrated in FIG. 1 with a matte backer applied across the back surface of the screen. Further, FIG. 5 shows a plot of I(x) 500 across a seam with a matte backer applied across the back surface with the same geometry as FIG. 1. The I(x) plot 500 includes a gain curve 510 illustrating a curve for viewing directions away from specular and a gain curve 520 illustrating a curve for specular direction viewing. For viewers far from the specular direction the backer may be substantially invisible, as illustrated by gain curve 510, whereas near the specular direction, the backer may contribute to the scattered intensity as illustrated by gain curve 520. These two examples encompass two cases of likely scenarios. Unless the gain curve of the PSA-substrate surface substantially matches the gain curve of the screen layer, different viewers may see a different intensity near the seam, which may or may not within a JND. Unless the additional intensity from the backer may be compensated the seam may appear as a bright line. Consequently, having the backer overlay the perforations may be undesirable unless the adhesive surface of the backer is appropriately prepared as discussed below.

Figure 6:
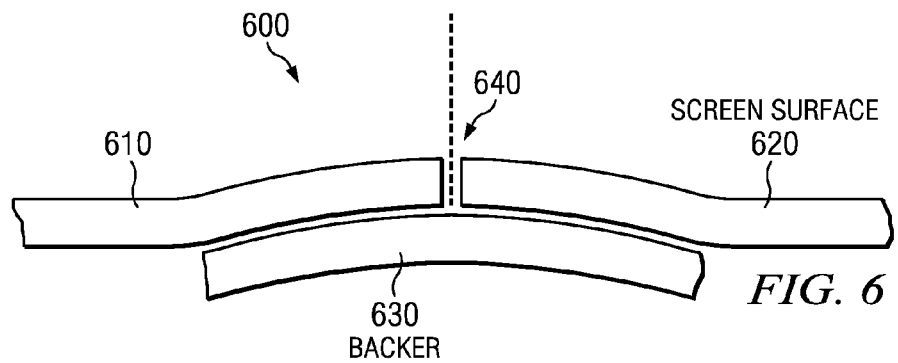
FIG. 6 is a schematic diagram illustrating one embodiment of a seam, in accordance with the present disclosure.

The use of screens with angular dependent scatter profiles may introduce a visible artifact due to the mechanical nature of the seam. FIG. 6 is a schematic diagram illustrating one embodiment of a seam. In the case of a backed butt-seam as shown in FIG. 6, the thickness of the screen may effectively increase at the seam. The structure 600 FIG. 6 includes a first piece of screen substrate 610, a second piece of screen substrate 620, a backer 630, and a seam 640. As shown in FIG. 6, the first and second piece of screen substrate 610 and 620, respectively, may be joined to form a seam 640, which may allow the backer 630 to be visible from the front side, through a gap created by the two pieces of screen substrate.

Continuing the discussion of FIG. 6, when tension is applied in the plane of the screen, the result may be that the surface of the screen has a tendency to "pucker" outwards. Because the angle of the surface may be changing across the seam, the viewer may view different parts of the gain curve. The result may be a brighter reflection from one side of the seam and a darker reflection from the other side of the seam relative to the bulk of the surface. This may result in the Cornsweet Illusion in which the seam may tend to appear as a highly visible brightness step such that it may appear to separate approximately uniformly different panels.

Compensation of Seam Gap

In the manufacture of conventional matte white projection screens, raw (perforated) PVC roll stock is seamed together to form the full screen. Due to the intrinsic nearly-lambertian scattering nature of the PVC, it may not be necessary for the screen surface to remain perfectly planar across the seam in order to maintain acceptable performance. Furthermore, the substrate near the seam can be re-melted to planarize the seam and fill any gap between sheets as long as care is taken to prevent a gloss surface; the disturbance remains substantially invisible. For gain screens, such as, but not limited to, silver screens, which may be highly directional in their scattering, it may become more important to substantially maintain the planarity across the seam because changes in the slope of the screen surface may become visible at some viewing angles as a change in brightness. However, for conventional screens, the coating that imparts the gain to the screen may be typically applied with a spray-gun after the seams are made. Consequently, it may still be possible to re-melt the surface prior to spray coating in order to planarize the surface and the spray will help to fill in small gaps between sheets.

In another example, the roll stock may be coated prior to seaming, for example, by using a roll-to-roll coating process. In this example, it may not be an option to melt the screen surface to fill the gap. In this case, the gap between sheets may be limited by the straightness with which the edge of the material can be slit and quality of the slit edge. A typical straightness tolerance for a precision-slit edge may be approximately ±25 microns yielding a mean gap width between adjacent sheets of approximately 25 microns. Damage to the coating at the slit edge might increase the effective gap by an approximately additional 5-10 microns pushing the total gap near the maximum acceptable width which may be on the approximate order of 50 microns. However, as long as the local average value of I(x) remains substantially constant, the screen may appear substantially uniform. The optical loss at the gap can be compensated by increasing the distance from the last perforation to the edge of the film according to the relation:

$$g = \frac{1}{2}\left(l - w + \frac{4hlw}{\pi d^2}\right)$$

In the above equation, the variables may be consistent with the variables as set forth in FIG. 1.

As an example, for approximately 1.2 mm perforations on a substantially square approximately 4.5 mm lattice, the distance from the final perforation to the gap may be increased from approximately 2.25 mm to approximately 2.59 mm in order to substantially compensate an approximately 40 micron gap between sheets. In practice, the mean gap, w, may be empirically determined due to the seaming process and then the perforation pattern may be adjusted in order to substantially compensate for it. An additional advantage of this technique may be to increase the distance between perforations at the seam allowing the use of a wider backer. Alternatively, the diameter of the perforation adjacent to the seam can be decreased to:

$$d' = \sqrt{d^2 - 2hw/\pi}$$

in which d' is the adjusted diameter of the perforation adjacent to the seam and the variables, as appropriate, are consistent with the variables as set forth in FIG. 1.

Increased Backer Width

As discussed above, compensating the gap between sheets or pieces of substrate by increasing the distance from the final perforation to the edge increases the maximum width of backer that may be used without covering a perforation. However, if the backer width is increased further to make the seam sufficiently strong, there are several techniques available.

Feathered Pattern

For relatively narrow backers, for example where b is the width of the backer, b<~7 mm, it may be possible to increase the distance from the last perforation to the edge such that g>b/2. The consequence of this may be that I(x) increases in the vicinity of the seam. The distance over which I(x) changes may be approximately equivalent to the spacing between perforations and at most viewing distances may be visible as a bright line. However it is possible to make use of the spatial frequency dependence of the contrast sensitivity of the human eye to mask the line by broadening it so that the change is more gradual. This may be accomplished by adjusting the spacing between perforations according to $$l_i = l + (n-i)\Delta$$

Where $l_i$ is the spacing between the i−1 and perforations, l is the bulk spacing between perforations, n is the number of perforations in the transition region, and (l+nΔ) is the maximum spacing between perforations. The result of this process may be that a sharp bright line at the seam is exchanged for a broad, diffuse brighter region. In the equation above, Δ may be chosen such that the intensity gradient in this brighter region is below a JND for most or all viewers. Additional space for the backer may be obtained by compensating for the seam gap according to the equation as set forth below:

$$g = \frac{1}{2}\left(l - w + \frac{4hlw}{\pi d^2}\right)$$

where l would be replaced by $l_0$. An alternative approach is to modify the diameter of the perforations near or by the seam. In one example, this may be achieved by combining equations:

$$d' = \sqrt{d^2 - 2hw/\pi}$$

and $$l_i = l + (n-i)\Delta$$

However in most cases modifying the tooling to produce a plurality of perforation or hole diameters may be more difficult than adjusting perforation or hole placement.

Printed Dots

The derivation of equation $$g = \frac{1}{2}\left(l - w + \frac{4hlw}{\pi d^2}\right)$$

is based on the recognition that the perforations are simply a source of optical loss on the screen surface. The perforations can be removed from the screen as long as they are replaced with an equivalent source of optical loss such as, but not limited to, black ink, black paint, black pigment, and so on. A wide variety of techniques are available for the application of ink such as, but not limited to, ink jet printing, hot-embossing, screen printing, and so forth. One of the optical requirements for the ink may be that the attenuation may not be dependent on the angle of incidence of the illuminating or scattered light. Therefore, inks with extremely high optical density may still be likely to have a reflection from their first surface that is on the order of approximately 4%. If the surface of the ink is planar, then this approximately 4% reflection could give rise to an objectionably large reflection.

The contribution of this reflection can be substantially removed in several ways. The general solution is to ensure that the attenuating coating has a substantially matte surface so that the first surface reflection may be scattered into approximately $2\pi$ steradians and thus does not contribute significantly to any one viewing direction. On engineered diffuser surfaces, such as described in commonly-owned U.S. Patent Application No. 2009/0190210 which is herein incorporated by reference in its entirety, an alternative technique may be to apply a substantially conformal attenuating coating such that the approximate 4% reflection may be scattered into the same distribution as the bulk of the screen.

One example of a pattern may include dots and/or circles printed with approximately the same diameter and on approximately the same lattice as the perforations. In one example of this pattern, the pattern may be substantially registered with the perforations in both the x and y directions within the sheet and across the seam. In this case, the screen may appear substantially uniform in at least the three previously described viewing regions and an observer would have to be close enough, for example less than approximately one meter away, to the pattern to resolve the edges of the perforations in order to perceive any disturbance. However, vertical offset of the perforations may be tolerable in many situations because vertical offset imparts little to no change in I(x) and thus no substantial change in the average intensity. Therefore the strictest tolerance may be registering the correct distance from the dots to the edge of the sheet or piece of substrate.

If a large percentage of the auditorium is at viewing distances so that the individual perforations are not resolvable, then the printed pattern may deviate significantly from the perforation pattern. In this case, the average local optical attenuation of the screen, $OA=\pi d^2/4lh$, may be constant.

Figure 7:
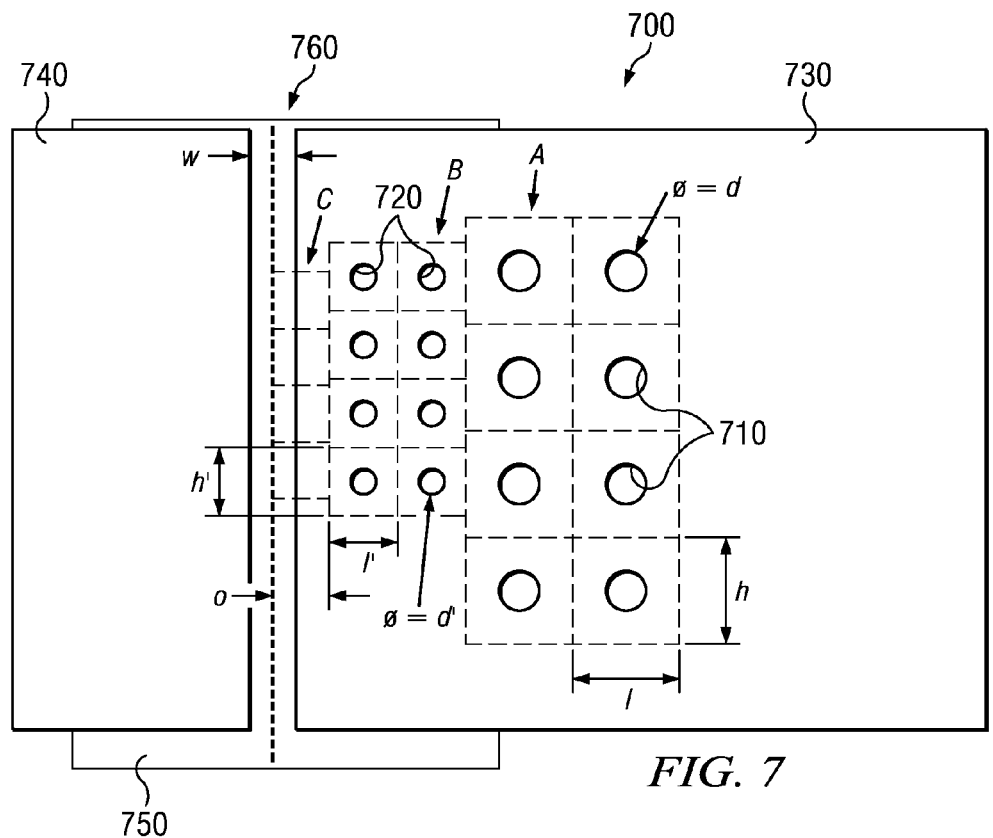
FIG. 7 is a schematic diagram illustrating one embodiment in which a pattern to engineer optical loss may be constructed, in accordance with the present disclosure.

FIG. 7 is a schematic diagram illustrating one embodiment in which a pattern to engineer optical loss may be constructed. Stated differently, FIG. 7 illustrates one example 700 of how a dot and/or perforation pattern can be constructed. FIG. 7 includes a first piece of substrate 730, a second piece of substrate 740, and a backer 750. As illustrated in FIG. 7, the first and second pieces of substrate 730, 740, respectively, may be joined by the backer 750 to create a seam 760. Additionally, FIG. 7 includes regions A, B, and C. As shown in FIG. 7, region A includes perforations 710, which may have a diameter d. The perforations 710 of region A may be surrounded by at least an area of screen material shown by dashed line boxes of approximate height, h, and approximate length, l. FIG. 7 also illustrates region B which includes dots 720 which may have a diameter d'. The dots 720 of region B may be surrounded by at least an area of screen material shown by dashed line boxes of approximate height, h', and length, l'. Furthermore, FIG. 7 illustrates region C which includes areas of screen material shown by dashed line boxes of width O. Moreover, the dashed line boxes of region C include an area of screen material in addition to an area of backer material. Each unique feature, perforations 710, dots 720, and seam 760, may be surrounded by an area of screen material indicated by dashed lines. As long as the percentage of attenuating surface within each of these areas remains substantially constant, the screen surface may appear substantially optically uniform at large distances, for example, $$\frac{\pi d^2}{4lh} = \frac{\pi d'^2}{4l'h'} = \frac{w}{2c}$$

The above equation enables the generation of dot patterns which may substantially compensate arbitrary seam gap widths and perforation placement. As the diameter of the dots decreases, the tolerance for deviations in dot diameter may also decrease. For example, an approximately 0.1 mm error in the diameter of an approximately 1.2 mm diameter dot may yield an error in loss of approximately 16% whereas an approximately 0.1 mm error in the diameter of an approximately 0.8 mm diameter dot may yield an error of approximately 23%.

In each case, the seam gap can be compensated by a number of techniques, including, but not limited to, adjusting the distance from the final dot to the edge of the screen according to equation $$g = \frac{1}{2}\left(l - w + \frac{4hlw}{\pi d^2}\right)$$

or by decreasing the diameter of the dot closest to the seam. This may allow a measure of flexibility in the manufacture process by making it possible to adjust the pattern to account for changes in the seaming process. The actual shape of the dots may not be as important as the total area. The diameter of the dots may be used as a direct proxy for area of circular features but square features could be equivalently used which may be more amenable to some printing processes.

Textured Backer

Figure 8:
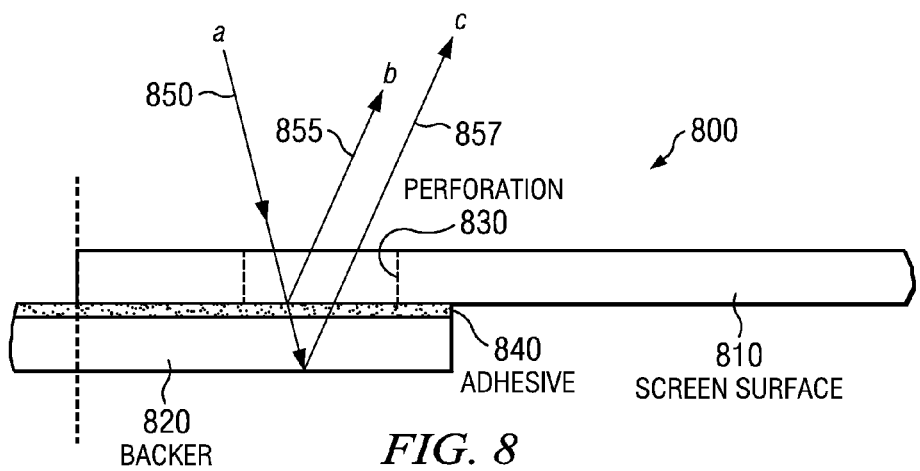
FIG. 8 is a schematic diagram illustrating one embodiment of a cross section of a screen, in accordance with the present disclosure.

FIG. 8 is a schematic diagram illustrating one embodiment of a cross section of a screen. Further, FIG. 8 shows a cross section of a screen taken through a perforation that is completely covered by the backer. FIG. 8 includes a cross section of a screen 800, a screen surface 810, a backer 820, a perforation 830, and an adhesive 840. There may be two possible approximately 4% reflections that can originate within the perforation 830 from an incoming ray (a) 850. Reflection (b) 855 is the reflection off of the front surface of the adhesive 840 and reflection (c) is the reflection off of the back surface of the backer 820 which may be present for transparent backer materials. As illustrated by FIG. 4, one example may be a substantially planar adhesive which may produce a strong primary reflection that may show as a bright reflection in the specular viewing directions. Because of the fluid or semi-fluid nature of most adhesives, the adhesives may tend to substantially planarize a surface which may result in a hotspot. For transparent backers, an additional approximately 4% reflection may be contributed by the back surface of the backer 820. In cases in which the front surface is matted enough to scatter the reflection, the back surface can contribute to the hotspot; the half-width of a transmissive diffuser may be significantly smaller than the half-width of a reflective diffuser.

FIG. 9 is a schematic diagram illustrating another embodiment of a cross section of a screen. FIG. 9 includes a cross section of a screen 900, a screen surface 910, a backer 915, an absorbing layer 920, a perforation 930, and an adhesive 940. There may be at least two possible reflections that can originate within the perforation 930 from an incoming ray (a) 950. Reflection (b) 955 is the first reflection off of the front surface of the adhesive 940 and reflection (c) 957 is the second reflection off of the back surface of the backer 920 which may be present for transparent backer materials. The diagrams in FIG. 9, FIG. 9A, FIG. 10, and FIG. 10A are not to scale. For example, the scale of the texturing may not be on the order of the thickness of the backer adhesive as illustrated in FIG. 9.

As shown in FIG. 9, one solution may be to arrange for the front surface of the backer to have a matte texture 960 such that any reflected light may be scattered into a wide range of angles. Examples of multiple incoming rays that may scatter and reflect off of the matte texture 960 in different directions are illustrated in FIG. 9A. This can be accomplished by texturing the backer 915 such that the surface acts like a diffuser with approximately the same structure as the bulk screen. This may substantially minimize the effect of the first reflection at any one angle. The second reflection can be eliminated by introducing a substantially absorbing layer 920, for example, by painting the back surface of a transparent backer, or by using a substantially black backer material.

Alternatively, the effect of the second reflection can be reduced by texturing the back surface of the backer as shown in FIG. 10. FIG. 10 is a schematic diagram illustrating another embodiment of a cross section of a screen. FIG. 10 includes a cross section of a screen 1000, a screen surface 1010, a backer 1015, a matted surface 1020, a perforation 1030, and an adhesive 1040. There may be at least two possible reflections that can originate within the perforation 1030 from an incoming ray (a) 1050. Reflection (b) 1055 is the reflection off of the front surface of the adhesive 1040 and reflection (c) 1057 is the reflection off of the back surface of the backer 1020 which may be present for transparent backer materials. Similar to FIG. 9A and as illustrated in FIG. 10A, there may be multiple incoming light rays and multiple reflections off of the matted surface 1020 that scatter in different directions. As previously discussed, the diagrams of FIG. 10 and FIG. 10A are not to scale.

For welded seams, if the backer is matte black, then as long as there is no reflow of the backer during welding, which may substantially planarize the surface, both conditions can be satisfied.

With a sufficiently viscous adhesive, such as, but not limited to, a UV-crosslinkable PSA, it may be possible to mold the surface of the adhesive to a matte texture. After bonding the two sheets, the UV light cross-links the adhesive to make the bond permanent and locks in the diffusing texture. The PSA can be embossed just prior to application by being pressed over a textured drum. Alternatively, the release liner that protects the film may be embossed in order to transfer the texture to the PSA. In both cases, the drum/release liner may not deposit any impurities on the PSA that may tend to weaken the adhesion.

For demanding applications in which changes in intensity are desirably smaller than the typical JND of a cinema environment, or in cases where the perforation area is relatively large, the diameter of the perforations can be increased where they are likely to be covered by backer material. For example, if the textured backer has a reflectivity of r into a gain distribution that approximates the gain distribution of the front of the screen, the perforation diameter can be increased to approximately:

$$d_2 = \frac{d_1}{\sqrt{1-r}}$$

Canted Seams

The change in surface slope across a seam under tension, which may be referred to as read-through, as shown in FIG. 6 can be decreased by increasing the rigidity of the substrate. Therefore it can be substantially suppressed by increasing the thickness of rigid substrates, such as, but not limited to, PC and PET substrates. However, it may be possible to make use of the fact that compound curvature (curvature in multiple axes) is substantially incompatible with rigid planar substrates. For example, bending a sheet around a single axis may involve relatively low energy whereas a much larger amount of energy may be involved to force it into compound curvature, such as stretching it onto the surface of a sphere or a saddle. Most gain screens may be installed with a curve around the vertical axis. The radius of curvature may be approximately equal to the distance from the screen to the projector. This curvature may ensure that the audience sees the highest brightness uniformity. If the seams are oriented in the horizontal direction, then the radius of curvature of the read-through may be around a horizontal axis. The local curvature due to read-through may involve significantly less energy to expel than the macroscopic curvature of the screen radius. Therefore the orientation for the seams to suppress read-through is substantially horizontal. Incremental improvement may still be possible by rotating the seams relative to the vertical direction.

As may be used herein, the terms "substantially" and "approximately" provide an industry-accepted tolerance for its corresponding term and/or relativity between items. Such an industry-accepted tolerance ranges from less than one percent to ten percent and corresponds to, but is not limited to, component values, angles, et cetera. Such relativity between items ranges between less than one percent to ten percent. As may be used herein, the term "substantially negligible" means there is little relative difference, the little difference ranging between less than one percent to ten percent.

While various embodiments in accordance with the principles disclosed herein have been described above, it should be understood that they have been presented by way of example only, and not limitation. Thus, the breadth and scope of this disclosure should not be limited by any of the above-described exemplary embodiments, but should be defined only in accordance with any claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 CFR 1.77 or otherwise to provide organizational cues. These headings shall not limit or characterize the embodiment(s) set out in any claims that may issue from this disclosure. Specifically and by way of example, although the headings refer to a "Technical Field," the claims should not be limited by the language chosen under this heading to describe the so-called field. Further, a description of a technology in the "Background" is not to be construed as an admission that certain technology is prior art to any embodiment(s) in this disclosure. Neither is the "Summary" to be considered as a characterization of the embodiment(s) set forth in issued claims. Furthermore, any reference in this disclosure to "invention" in the singular should not be used to argue that there is only a single point of novelty in this disclosure. Multiple embodiments may be set forth according to the limitations of the multiple claims issuing from this disclosure, and such claims accordingly define the embodiment(s), and their equivalents, that are protected thereby. In all instances, the scope of such claims shall be considered on their own merits in light of this disclosure, but should not be constrained by the headings set forth herein.

What is claimed is:

1. A method for managing optical non-uniformities, comprising:
   substantially masking a change in optical loss at a seam by broadening a region over which the change in optical loss occurs; and
   gradually varying the perforation pattern by the seam.

2. The method for managing optical non-uniformities of claim 1, wherein gradually varying the perforation pattern further comprises increasing the cross-web spacing of the perforation pattern by the seam.

3. The method for managing optical non-uniformities of claim 1, further comprising tapering the space between the perforations over a distance such that the change in optical intensity reflected from the material forming the seam may be below a just noticeable difference.

4. The method for managing optical non-uniformities of claim 1, wherein gradually varying the perforation pattern further comprises increasing the distance from the edge of the film to the last perforation relative to the seam.

5. The method for managing optical non-uniformities of claim 4, further comprising gradually decreasing the distance between perforations as a function of the distance from the edge of the seam.

6. A method for managing optical non-uniformities, comprising:
   maintaining a substantially constant average optical loss across an interface by printing patterns over a region in which the optical loss occurs, wherein the patterns optically absorb at least some light.

7. The method for managing optical non-uniformities of claim 6, further comprising maintaining a substantially spatially uniform perforation pattern across a web material, wherein the perforation pattern stops short of the edge of the web material, thus creating a non-perforated region in the vicinity of the edge of the web material.

8. The method for managing optical non-uniformities of claim 7, further comprising printing an array of black dots on the non-perforated region in the vicinity of the edge of the web material.

9. The method for managing optical non-uniformities of claim 8, wherein the black dots of the array of black dots are matte black dots that are substantially optically absorbing.

10. The method for managing optical non-uniformities of claim 8, further comprising decreasing the diameter of the black dots closest to the seam.

11. The method for managing optical non-uniformities of claim 8, further comprising printing black dots that are approximately the same diameter and spacing as the perforations.

12. The method for managing optical non-uniformities of claim 8, further comprising approximately registering the array of black dots with the perforation pattern.

13. The method for managing optical non-uniformities of claim 8, further comprising printing the black dots with a smaller diameter and a smaller lattice spacing than the perforation pattern.

14. The method for managing optical non-uniformities of claim 6, wherein the printed pattern further comprises printing ink dots, wherein the attenuation of the ink may not be substantially dependent on the angle of incidence of illuminating light or scattered light.

15. A method for forming a seam that substantially reduces the appearance of optical non-uniformities at the seam, comprising:
   maintaining approximately constant average optical loss in the vicinity of the seam by substantially controlling reflectivity in the vicinity of the seam, wherein substantially controlling reflectivity in the vicinity of the seam further comprises employing a backer treated to minimize optical reflectivity over a range of angles.

16. The method for forming a seam of claim 15, wherein the backer includes an adhesive with an embossed texture that serves to substantially diffuse specular reflection.

17. The method for forming a seam of claim 15, wherein the backer is coated with a diffuse black material.

18. The method for forming a seam of claim 17, wherein the diffuse black material is patterned in a dot pattern on the backer.

19. The method for forming a seam of claim 18, wherein the diffuse black material is patterned in at least a row.

20. The method for forming a seam of claim 18, wherein the black dots on the backer are approximately registered with the perforation pattern.

21. A front projection screen with a projection surface, the front projection screen, comprising:
   a first portion of a first substrate and a first portion of a second substrate, wherein the first portion of the first substrate and the first portion of the second substrate are perforated with holes; and
   a backer operable to join the first portion of the first substrate and the first portion of the second substrate, wherein the first portion of the first substrate forms a seam with the first portion of the second substrate, further wherein the backer is textured such that the surface of the first side of the backer performs substantially similar as a diffuser.

22. The front projection screen with a projection surface of claim 21, wherein the first side of the backer further comprises a textured surface.

23. The front projection screen with a projection surface of claim 22, wherein the textured surface is proximate to an adhesive.

24. The front projection screen with a projection surface of claim 21, wherein the second side of the backer further comprises an absorbing layer.

25. The front projection screen with a projection surface of claim 21, wherein the second side of the backer further comprises a textured surface.

* * * * *